UNITED STATES PATENT OFFICE.

MAXIMILIAN RIEGEL, OF LONDON, ENGLAND.

MANUFACTURE OF MILK-POWDER.

No. 860,327.    Specification of Letters Patent.    Patented July 16, 1907.

Application filed May 8, 1905. Serial No. 259,446.

*To all whom it may concern:*

Be it known that I, MAXIMILIAN RIEGEL, a subject of the Emperor of Germany, and a resident of London, in the county of Middlesex, England, have invented a certain new and useful Improvement in the Manufacture of Milk-Powder, of which the following is a specification.

This invention relates to improvements in the production of milk powder and has for its object the provision of a process whereby readily soluble milk powder, containing all the constituent parts of milk with the exception of water, and free from any ingredients foreign to milk, may be produced. Moreover, the invention shall provide a simple and easily applied process for securing soluble milk powder.

Numerous methods are known and now in use for reducing milk to a powdered state. Such methods result in milk powder as a rule only partially soluble so that the addition of water will not yield a fluid in every way identical with natural, fresh milk. In fact only the dried milk sugar and a portion of the dried milk salts redissolve, the albuminous matter, principally casein, remaining undissolved. Such milk powder dissolved in water, yields a fluid, often quite heavily colored, which is deficient in casein in the main part and, therefore, also deficient in the various milk salts which depend upon said casein for dissolving effect and emulsification.

The insolubility of the casein of dried milk is commonly attributed to the presence of lactic acid in the fresh milk. However, it is also in part caused by the preliminary heating of the milk in pasteurizing as well as the heating during the drying or evaporating operation at which time the soluble calcium salts of milk are converted into insoluble lime salts. At the same time a portion of lime is precipitated due to the action of lactic acid. To remove these defects it has been proposed to neutralize the acid of fresh milk with sodium bicarbonate. The use of such chemical is unsatisfactory, however, because the soda reacts with the glycerids contained in the butter fat of the milk to form soap, the result being a decidedly soapy taste. In some of the hitherto known and employed processes calcium chlorid is added to overcome the acidity of milk. The addition of this chemical has many serious effects, the principal one being that it radically changes the natural composition of the milk thereby destroying the natural flavor. In addition thereto, if a reaction between said calcium chlorid and the milk does take place, a distinctly strong mineral acid (hydrochloric acid) is liberated, a feature attendant with serious results. The use of lime *per se*, proposed in some processes, is accompanied with a number of disadvantages, chief among which is the caramelization of the milk-sugar, a feature which causes strong coloration of the redissolved powder. I have ascertained that these various effects and defects can be successfully overcome by adding to the milk to be dried small quantities of calcium compounds of polyatomic alcohols of the carbohydrate group, as, for example, beet, that is, cane-sugar, grape-sugar, etc. The quantity of calcium-alcoholate added must be sufficient to introduce to the milk a quantity of lime exactly equivalent to the quantity of this material precipitated and eliminated by the action of lactic acid and heat. I have ascertained that, dependent upon the lactic acid acidity of milk, which is a factor of variable value, a correspondingly large or small amount of lime will be precipitated from milk upon heating and that, dependent upon this same acidity, a correspondingly large or small amount of the hereinbefore mentioned calcium-alcoholate must be added to replace the lime which is precipitated, because of the action of said lactic acid. If then a certain amount of lime is precipitated and removed for instance by filtration and an amount of soluble calcium-alcoholate with a lime content corresponding to the amount of lime precipitated, is added and the milk is dried by complete evaporation of its moisture, a product results which, when dissolved in water, in no way differs in composition from natural, fresh milk.

The compounds, generically termed calcium-polyatomic alcoholates, have the property of being water-soluble and of containing nothing foreign to the milk save unappreciable quantities of sucrose, dextrose, glycerin or whatever alcohol may have been brought into combination with calcium, the lime portions of such compounds being an ingredient naturally existent in milk. If a calcium compound of milk-sugar be employed no foreign matter whatever will be added to the milk. The eliminated lime of milk being exactly replaced with lime in combination with an organic alcohol, it follows that a milk powder, prepared in accordance with my process, will yield an ash in every way identical with material resulting from the calcination of fresh milk because the organic alcohols will necessarily be consumed in combustion.

While calcium compounds of polyatomic alcohols as a class are applicable in my process the compounds best adapted thereto are combinations of lime and substances recognized as sugars and the most advantageous of these sugar compounds of lime are the ones resulting from a combination of cane-sugar, that is sucrose, with lime. Three such calcium-sucrates, the mono, bi- and tri-calcium sucrates, generally spoken of as saccharates, are known and are referred to in connection with the following chemical formulæ:—

1. Mono-calcium sucrate or saccharate=$(C_{12}H_{22}O_{11}).CaO.2H_2O$— (soluble in water).
2. Bi-calcium sucrate or saccharate=$(C_{12}H_{22}O_{11}).2CaO$— (soluble in water).
3. Tri-calcium sucrate or saccharate=$(C_{12}H_{22}O_{11}).3CaO.3H_2O$— (insoluble in water).

For the purposes of my invention the soluble compounds, viz., the mono- and the bi-calcium saccharates, are best adapted and it is these compounds to which preference is given. Their preparation is very simply effected by adding lime (CaO) to an aqueous solution of sucrose if the reaction mixture be kept cool.

To the end that my invention may be realized I heat the milk to the temperature of pasteurization after having determined its acidity, remove the insoluble lime precipitated by such heating and add the soluble calcium saccharate in quantities sufficient to neutralize part of the lactic acid present, an operation which will be dependent upon the previously mentioned acid determination and then evaporate the milk. The calcium saccharate may be added either before or during the evaporation, the manipulation of either case being identical. The lactic acid in the milk is bound to precipitate and, therefore, cause the elimination of a definitely fixed quantity of lime. A quantity of lime corresponding to this eliminated amount is added to material operated upon and the original quantitative relation of one constituent part of the milk to the other will be restored and it is immaterial whether such restoration be effected before, or during evaporation.

The removal of the precipitated lime can be effected in any suitable manner, filtration being a well-known and thorough means for this step. It may be expedient to permit the precipitation to proceed in the evaporation vessel, the quantities of lime thrown down being so minute as to cause no great accumulation of sediment.

The quantity of soluble saccharate to be added depends upon, as hereinbefore explained, the degree of acidity of the milk and the determination of this must necessarily be carefully and painstakingly conducted. For example, if the solution of soluble calcium saccharate used is of a strength such that one cubic centimeter of the same is capable of neutralizing two cubic centimeters of normal hydro-chloric acid volumetric solution and if the milk of good quality and not more than two to four hours old possesses an acidity of 7 degrees—the determination to be made according to the method of Dr. Gerber, Zürich—the addition of 0.75% by weight of calcium saccharate solution to the milk is indicated.

Treated in the manner hereinbefore described the evaporated milk will yield a powder containing the albuminous matter associated with lime as in ordinary milk. Mixed with eight or nine times its weight of water, the said powder will be completely dissolved and will yield a liquid having all the characteristics of normal, pasteurized milk, the taste and smell of which will in no way differ from that of such milk. There will be no foreign color, a condition brought about through the non-caramelizing effect of the calcium saccharate upon the sugars contained in the milk. The addition of calcium saccharate to milk is thus distinguished from all other processes, in which either a neutral calcium salt of a mineral acid, or lime in its free state is employed for the purpose of neutralizing the lactic acid of fresh milk. The results are that no caramelization of milk-sugar takes place, that the powder is completely re-dissolved when water is added and that the finished milk powder shows, upon analysis, a percentage content of ingredients and a list of component parts identical with those of fresh milk.

I claim:—

1. The herein described process of producing soluble milk powder, consisting in heating the milk to the temperature of pasteurization, in removing the lime precipitated thereby in replacing the said eliminated lime by the addition of soluble calcium compounds of polyatomic alcohols of the carbo-hydrate group and in evaporating the milk to dryness.

2. The herein described process of producing soluble milk powder, consisting in heating milk to the temperature of pasteurization, in removing the lime precipitated thereby, and in replacing the said eliminated lime by the addition of soluble calcium compounds of polyatomic alcohols of the carbo-hydrate group in such quantities that the original percentage content of calcium is restored, and in evaporating the milk to dryness.

3. The herein described process of producing soluble milk powder, consisting in pasteurizing milk, in removing the lime precipitated thereby, in replacing the said eliminated lime by the addition of soluble calcium sucrate in such quantities that the original percentage content of calcium is restored, and in evaporating the milk to dryness.

4. The herein described soluble milk powder, consisting in the solid constituents of milk free from the insoluble calcium compounds and containing a soluble calcium compound of a polyatomic alcohol of the carbo-hydrate group having a calcium content equivalent to the amount of calcium salt contained in the said eliminated insoluble calcium compounds.

5. The herein described soluble milk powder, consisting in the solid constituents of milk free from the insoluble calcium compounds and containing soluble calcium sucrate with a calcium content equivalent to the amount of calcium salt contained in the said eliminated insoluble calcium compounds.

In testimony whereof I have signed my name to this specification in the presence of two subscribing witnesses.

MAXIMILIAN RIEGEL.

Witnesses:
JNO. ARMSTRONG, Junr.,
W. HOWIESON.